No. 620,357. Patented Feb. 28, 1899.
J. A. PRESTWICH.
MECHANISM FOR PROPELLING AND EXPOSING FILMS IN KINETOSCOPIC APPARATUS.
(Application filed Dec. 28, 1897.)
(No Model.) 2 Sheets—Sheet 1.
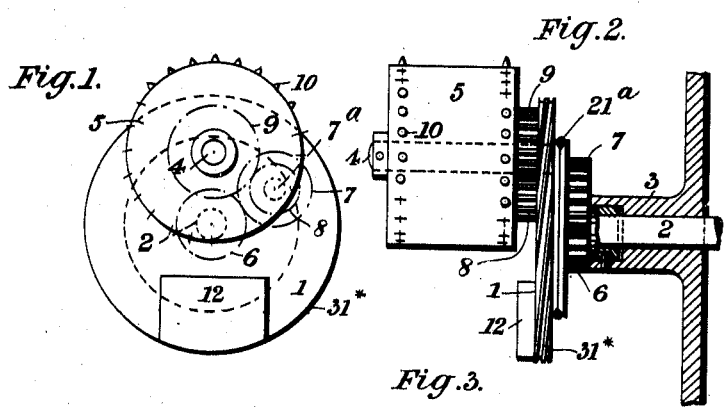
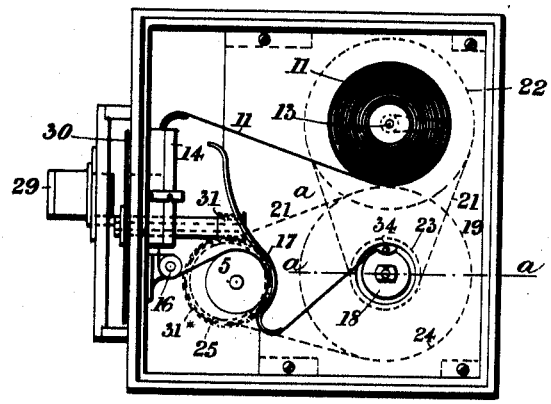
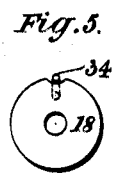
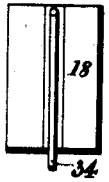
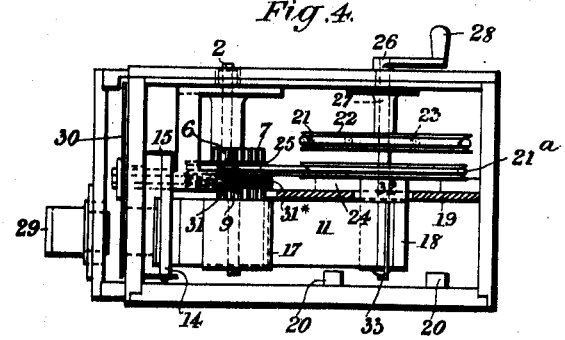
WITNESSES: Fred White, Thomas F. Wallace
INVENTOR: John Alfred Prestwich, By his Attorneys No. 620,357. Patented Feb. 28, 1899.
J. A. PRESTWICH.
MECHANISM FOR PROPELLING AND EXPOSING FILMS IN KINETOSCOPIC APPARATUS.
(Application filed Dec. 28, 1897.)
(No Model.) 2 Sheets—Sheet 2.
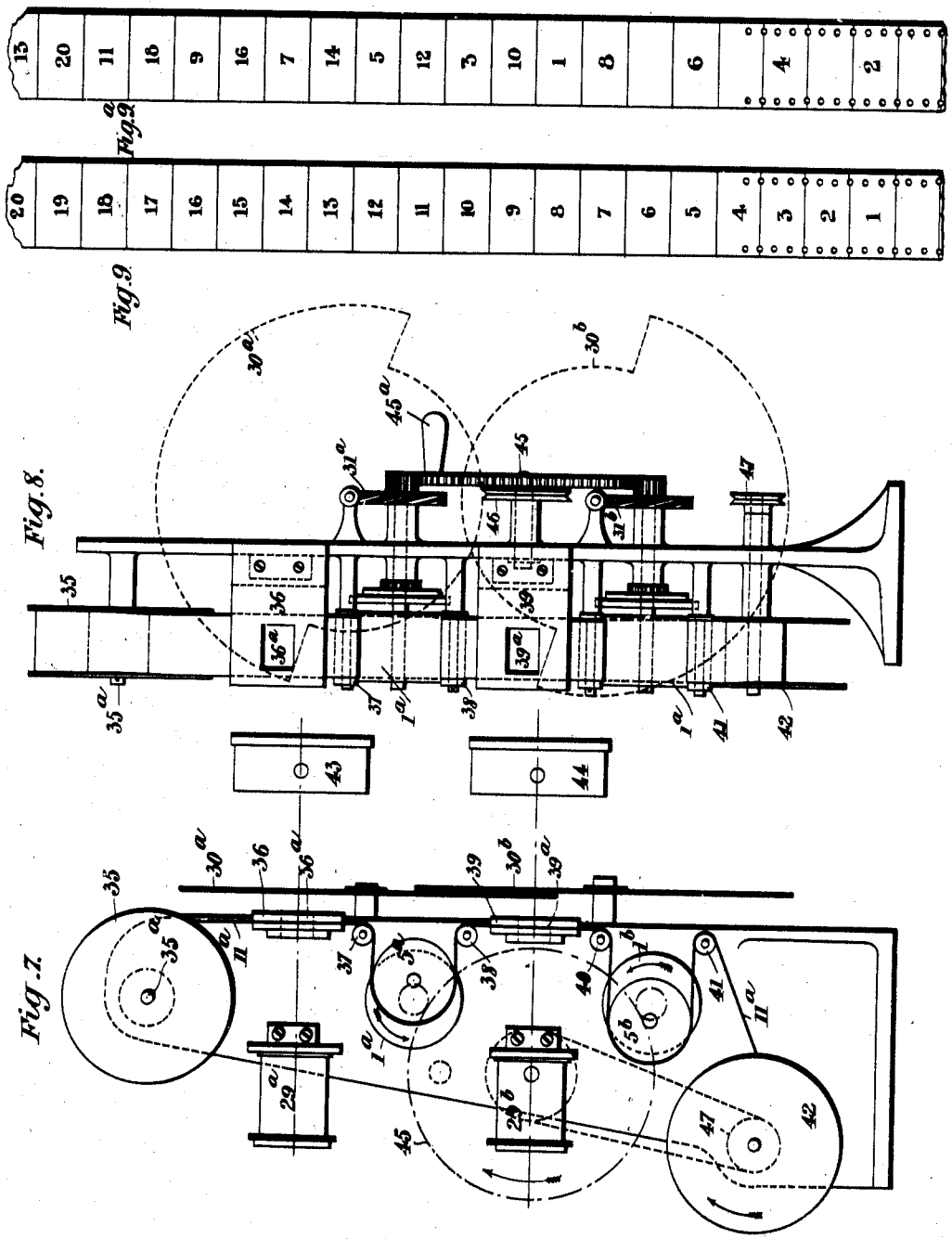
WITNESSES: INVENTOR:

UNITED STATES PATENT OFFICE.

JOHN ALFRED PRESTWICH, OF LONDON, ENGLAND.

MECHANISM FOR PROPELLING AND EXPOSING FILMS IN KINETOSCOPIC APPARATUS.

SPECIFICATION forming part of Letters Patent No. 620,357, dated February 28, 1899.

Application filed December 28, 1897. Serial No. 663,820. (No model.)

*To all whom it may concern:*

Be it known that I, JOHN ALFRED PRESTWICH, of Tottenham, London, England, have invented certain new and useful Improvements in Mechanism for Propelling and Exposing Films in Kinetoscopic Apparatus, (for which I have obtained patents in Great Britain, No. 17,224, bearing date August 4, 1896, and in France, No. 266,632, bearing date May 4, 1897,) of which the following is a specification.

This invention relates to film propelling and exposing mechanisms adapted to be used in what are known as "kinetoscopic" apparatus—that is to say, in instruments for taking or for exhibiting in rapid succession a series of photographs of an animated scene or moving object in such manner as to reproduce an exact picture of the scene or object which was photographed in the first instance. Several examples of such instruments are now well known.

My invention has direct reference only to the automatic manipulation of the film or long photographic strip used in taking or reproducing such kinetoscopic pictures. It makes no change otherwise in existing cameras for taking such pictures or in exhibiting or projecting apparatus for reproducing them.

My invention provides an improved film manipulating or propelling mechanism whereby the long strip or film in being continuously unwound from one roller or reel and rewound on another is conducted in its passage between them past an aperture provided with a shutter. The portion of film opposite said aperture is stopped and held motionless while the shutter momentarily uncovers the aperture and exposes the film. Upon the shutter again closing the aperture the film is set in rapid motion and advanced a prescribed distance, (at least equal to the width of the aperture,) and again its portion coincident with the aperture is brought to rest, and by the opening of the shutter this new portion of the film is exposed, and so on, the portion of the film traveling between said reels being alternately stopped and advanced at rapidly-recurring intervals. By a further development of my invention I provide duplicate film-propelling mechanisms in connection with two apertures, by which the same film has different portions of its surface exposed in alternate order at the two apertures, this being the most complete and the preferred embodiment of my invention.

In the accompanying drawings, Figures 1 and 2 are respectively a side elevation and a front elevation of the film-propelling mechanism. Fig. 3 is a side elevation of one form of kinetoscopic apparatus including such film-propelling mechanism, the door or side being removed and the figure being on a smaller scale than the preceding. Fig. 4 is a plan of Fig. 3 with its top removed, the partition 19 being in section on the line $a\ a$ in Fig. 3. Figs. 5 and 6 are respectively a side elevation and a plan, on a larger scale, of the roller 18. Fig. 7 is a side elevation of the preferred form of apparatus containing my entire invention, the film-propelling mechanism and shutter being duplicated. Fig. 8 is a rear elevation of the mechanism shown in Fig. 7. Figs. 9 and $9^a$ are diagrammatic representations of the film or photographic strip, showing the order of the pictures thereon, Fig. 9 showing the strip used with the apparatus shown in Figs. 3 and 4, and Fig. $9^a$ showing that used with Figs. 7 and 8.

I will first describe the film-propelling mechanism with reference to Figs. 1 and 2. The reference-numeral 1 designates a disk fixed to a coaxial spindle 2, which revolves in a fixed bearing 3. The disk carries a pin or crank 4, on which can revolve a drum 5, which is driven by means of an epicyclic train of wheels, the first or dead wheel 6 being fastened to the end of the bearing 3 centrally to the disk 1. This wheel 6 gears with a wheel 7, which is fixed on a spindle $7^a$, carried by the disk 1, on which spindle is also fixed a wheel 8, gearing with a wheel 9, to which the drum 5 is attached. The drum 5 is fitted, preferably, with a circular peripheral row of pins 10, which engage in perforations provided in the two longitudinal edges of the film 11, (see Fig. 9 or Fig. $9^a$,) which passes over the drum, as indicated in Fig. 3 or Fig. 7. The distance of the pin 4 from the center of the disk 1 and the ratio of the train of wheels are so proportioned as to give the required amount of "draw" of the film for each revolution of the disk 1. If, for example, the draw required for each revolution of the disk 1 be equal to half the circumference of the drum 5, then the distance of the pin 4 from the center of the disk 1 should be preferably about equal to one-fourth the amount of draw, and the ratio of the train of wheels would be one-half, which would cause the drum to revolve half a revolution on its own axis while the disk revolves one revolution. Assuming the drum to be in the position shown in Figs. 1 and 2 and the film (not shown in those figures) to be hanging down vertically toward the ground and the disk 1 be revolved half a revolution until the drum is in the bottom position, then if the drum were not geared as shown, but were fixed to the pin 4, it would wind up half its own circumference less that length which is lost by the drum descending from the top to the bottom position, which in this instance is one-half of what it tends to wind, (or one-quarter its circumference,) so the drum would only draw the film a distance from the ground equal to one-quarter of its circumference; but the drum 5 being geared to turn half a revolution on its own axis in the opposite direction while the disk 1 turns one revolution the drum will make one-quarter of a revolution while the disk 1 turns one half-revolution. This turning of the drum through a quarter of a revolution will unwind a length of film equal to one-quarter the circumference of the drum 5, so that the film will not be drawn from the ground, but will remain stationary. During the other half-revolution a length of film will be drawn equal to the distance through which the pin 4 rises (and which is equal to one-quarter the circumference of the drum 5) in addition to the length of the film, (equal to one-quarter of the circumference of the drum 5,) which will be drawn by the drum turning about the center of the disk half a revolution and unwinding for a quarter of its circumference by turning a quarter of a revolution on its own axis. Thus for half a revolution of the disk 1 the film will not be drawn; but during the other half-revolution it will be drawn an amount equal to half the circumference of the drum. The result is that the film or photographic strip remains stationary during a determined interval of time, while during the next and equal interval it is moved forward with a movement which during the first half thereof is gradually accelerated and during the remaining half is gradually retarded. In applying this film-propelling mechanism as part of a kinetoscopic apparatus it is only necessary to cause the film to travel past an aperture which is provided with a shutter so geared to the film-propelling mechanism as to open and uncover the aperture during the successive periods of repose of the film and to cover the aperture during the periods while the film is advancing.

Internal gear-wheels or other gears may be used, if desired, in place of those illustrated to accomplish the same result. By providing means for turning the dead-wheel 6 the film can be adjusted and brought into correct position either while the apparatus is stationary or is working, this being desirable when no pins are provided on the drum 5 and there are no perforations in the film. The projection 12 is a counterweight on the disk 1 to balance the drum.

Figs. 3 and 4 show a simple kinetoscopic apparatus comprising the mechanical movement thus described. The roll of film 11 is mounted on a roller 13. From this roller the film passes through friction-plates 14, which are adapted to open on a hinge 15 to receive the film. From these the film passes around a guide-roller 16 over the drum 5 of the film-propelling mechanism, (shown separately in Figs. 1 and 2,) then under the shield 17, and is finally rewound on a roller 18. The film 11 is guided in position sidewise by the partition 19 and strips 20 20 on the door. The several rollers are driven by means of gut cords 21 21$^a$, passing over grooved pulleys 22 23 and 24 25. Pulley 22 is mounted on spindle 26, which turns in a bearing 27. To this spindle is fitted the crank 28, by which the apparatus is worked. The pulley 22 drives the pulleys 23 and 24, which are fixed on the same shaft, by means of a gut cord 21. The pulley 24 drives pulley 25, which is fastened on the spindle 2 of the disk 1. Thus the required number of revolutions of disk 1 is obtained by one revolution of the crank 28.

The aperture through which the film is exposed is provided in the friction-plates 14 opposite to the lens 29 and is adapted to be covered by the disk-shutter 30, which is revolved by skew-gear wheels or worm and worm-wheel 31 31$^\times$, the edge of disk 1 being cut to constitute the worm 31$^\times$.

On turning the handle 28 the disk 1 is turned by means of the gut-cord pulleys, which also turn the roller 18, on which the film is rewound. This roller 18 is on the same spindle as the pulleys 24 and 23 and is pressed against the boss 32 of pulley 24 by a spring-washer 33, which allows the roller 18 to slip, so as to accommodate it to the varying diameter of the roller as the film is wound on. Referring to the enlarged views, Figs. 5 and 6, of the roller 18, illustrating the mode of fastening the end of the film, 34 is a spring-wire let into a recess in the roller 18 and under which the end of the film is clipped.

In the use of the apparatus just described the photographs are taken in numerical order, as shown in Fig. 9, where the succession is indicated by numerals running successively from 1 to 20, &c. In reproducing the moving scene the strip or film containing the photographs on being passed through the same apparatus is exposed in the same regular numerical order.

The simple apparatus thus described is subject to the disadvantage (in common with certain other kinetoscopic apparatus) that in photographing the successive photographs are separated by an interval corresponding to the time required for advancing the film, and in reproducing the moving picture the successive exposures thereof are separated by equal periods of darkness, which causes an unpleasant sensation to the eyes, especially when the picture is thrown upon a screen. This objection is overcome in the duplex kinetoscopic apparatus shown in Figs. 7 and 8, which I will now describe. In this apparatus the film is wound on the bobbin 35, which turns on a pin 35$^a$. From this bobbin the film 11$^a$ passes through friction-plates 36, around a guide-roller 37, around the drum 5$^a$ of the movement 1$^a$, around a guide-roller 38, through friction-plates 39, around a roller 40, around the drum 5$^b$ of movement 1$^b$, around roller 41, and finally is rewound on bobbin 42. Apertures 36$^a$ and 39$^a$ are provided in the friction-plates 36 and 39, through which to expose the films when these apertures are uncovered by their shutters. The apertures are opened and closed alternately by the shutters 30$^a$ 30$^b$, (shown in dotted lines in Fig. 8,) which are driven by skew or worm gearing 31$^a$ 31$^b$, Fig. 8. The two movements 1$^a$ 1$^b$ are geared to and driven by a gear-wheel 45 by means of a handle 45$^a$. A gut-cord pulley 46 is fastened to the wheel 45 and drives a gut-cord pulley 47, which drives the winding-up bobbin 42, the gut slipping to accommodate the varying diameter of the bobbin as the film is wound on. The movements 1$^a$ and 1$^b$ each draw a length of film equal to two pictures at each revolution. Movement 1$^a$, for instance, is drawing film through friction-plates 36, the aperture 36$^a$ being covered by the shutter 30$^a$, while the film is stationary in the friction-plates 39, the aperture 39$^a$ being uncovered by shutter 30$^b$ and exposure of the picture taking place through said aperture. When the movement 1$^b$ begins to draw film through friction-plates 39, the aperture 39$^a$ is closed by shutter 30$^b$ and the motion 1$^a$ gives off film on the lower side while the film in friction-plates 36 is stationary, the aperture 36$^a$ being uncovered by the shutter 30$^a$. As the movements 1$^a$ 1$^b$ draw a length of film equal to twice the size of a picture, half only will be exposed through the aperture 36$^a$. The part that is unexposed by this aperture is exposed through the aperture 39$^a$ when said part reaches said aperture. In this manner in photographing the film is exposed with the successive negatives arranged in the order indicated in Fig. 9$^a$. The printed film consequently has the same arrangement and is adapted to be projected in the same apparatus. The pictures on the film are thus printed so that they will be exposed in their correct order alternately at the apertures 36$^a$ and 39$^a$.

In the example shown in Fig. 9$^a$ the length or path of the film between the centers of the two apertures 36$^a$ and 39$^a$ is assumed to be equal to the united lengths of seven pictures. In Fig. 9$^a$ the numerals indicate the order in which the several pictures are taken or reproduced, the odd-numbered pictures being exposed through the upper aperture 36$^a$ and the even-numbered pictures being exposed through the lower aperture 39$^a$. The arrangement is such that the center of, say, the picture exposed through one aperture is coincident with the center of said aperture while the next picture to be exposed through the other aperture is being drawn down.

It will be understood that in using the duplex apparatus shown in Figs. 7 and 8 the optical axes of the lenses for the two apertures must converge so as to intersect at a distance which in photographing corresponds to the focal plane of the picture or in projecting corresponds to the plane of the screen.

It will be understood that my invention is applicable for any of the uses to which kinetoscopic apparatus are commonly applied. Thus it is useful for, first, photographing the successive scenes upon a sensitized negative strip or film; second, printing positive pictures from such negative film; third, exhibiting the positive pictures either in an inclosed box after the manner of the Edison kinetoscope or by projecting pictures on a screen after the manner of the so-called "kinematograph."

In photographing, the apparatus has only to be equipped with the ordinary photographic lens, as shown at 29 in Figs. 3 and 4. In printing a positive from a negative strip it is only necessary to pass the two strips together through the apparatus while the aperture is exposed to light. For exhibiting the pictures by projection upon a screen the apparatus has to be equipped with a source of light, a condenser, and a lens, which equipment I have shown in connection with the duplex apparatus in Figs. 7 and 8, where 29$^a$ and 29$^b$ are the lenses through which the light is first passed, and 43 and 44 are the condensers. All these equipments are well understood in kinetoscopic photography and form no part of my invention. It is immaterial to my invention whether the same apparatus be adapted for these various equipments or whether separate apparatus be provided for each distinct use.

If desired, my invention can be applied by using the single-acting apparatus, Figs. 3 and 4, as the camera in which to take the kinetoscopic photograph and the duplex apparatus, Figs. 7 and 8, as the means for exhibiting the pictures. In such case the negative film having the exposures in the order shown in Fig. 9 should be passed in contact with the film on which the positives are to be printed twice through the apparatus shown in Figs. 7 and 8. The first time it is passed through this apparatus the light is projected through one aperture only. The negative film is then shifted along the positive film a distance equal to the length of the path of the film between the two apertures 36$^a$ and 39$^a$ plus the length of one picture. The result would be a positive film on which the pictures are printed in the order shown in Fig. 9$^a$. Used in this manner the projecting apparatus must turn at one-half the speed of the photographing apparatus.

My invention may be variously modified without departing from its essential features. For example, in the case of a film having no driving perforations the drawing-drum 5 of the film-propelling mechanism may be devoid of driving-pins, the film being held against the drum in any other effective manner—as, for example, by means of rollers.

I claim as my invention—

1. A film-propelling mechanism consisting of a revolving crank, a film-drawing drum mounted eccentrically thereon, and an epicyclic train of wheels turning said drum relatively to said crank, substantially as described.

2. A film-propelling mechanism consisting of a revolving crank, a film-drawing drum mounted on the crank-pin, and an epicyclic train of wheels imparting to said drum a backward rotation relatively to said crank at a slower speed than that of the crank, substantially as described.

3. A film-propelling mechanism comprising a driving-spindle 2, revolving crank 1 carried thereby, a film-drawing drum 5 mounted on the crank-pin, a normally-stationary pinion 6, a pinion 7 carried by said crank and meshing with the pinion 6, a pinion 8 fixed to and turning with the pinion 7, and a pinion 9 meshing with the pinion 8 and communicating rotary motion to the drum, substantially as described.

4. A film-propelling mechanism consisting of a revolving crank, a film-drawing drum mounted eccentrically thereon, and an epicyclic train of wheels turning said drum relatively to said crank, combined with a casing having an aperture past which the film is led on its way to said drum, and a shutter for intermittently closing said aperture, geared to said film-drawing mechanism to uncover said aperture during successive periods of rest of the film, and to cover the same during the periods of movement of the film, substantially as described.

5. A duplex kinetoscopic apparatus comprising a casing having two apertures, two shutters adapted to uncover said apertures alternately, and two film-drawing mechanisms operating in alternate order, substantially as described.

6. A duplex kinetoscopic apparatus comprising a casing having two apertures, two shutters adapted to uncover said apertures alternately, and two film-drawing mechanisms adapted to engage successive portions of one film and to advance such portions alternately, whereby to expose stationary portions of said film alternately at said apertures, substantially as described.

7. A duplex kinetoscopic apparatus comprising a casing having two apertures, two film-drawing mechanisms adapted to draw a film past said apertures, each mechanism independently controlling the portion of film to be exposed at one aperture, said mechanisms consisting each of a revolving crank, a drum mounted eccentrically thereon, and an epicyclic train of wheels turning said drum relatively to said crank in such manner that the rotation of the drum alternately advances the film and leaves it stationary, and said mechanisms arranged to operate in alternate order, so that while one portion of film is stationary at one aperture, the other portion is moving past the other aperture, and shutters adapted to uncover the apertures alternately for exposing through each the portion of film which is at rest, substantially as specified.

In witness whereof I have hereunto signed my name in the presence of two subscribing witnesses.

JOHN ALFRED PRESTWICH.

Witnesses:
  JOHN C. NEWBURN,
  GEORGE C. BACON.